(12) United States Patent
Rotshtein et al.

(10) Patent No.: US 8,972,900 B2
(45) Date of Patent: Mar. 3, 2015

(54) CLIENT-SIDE GENERATION AND FILTERING OF HIERARCHY INFORMATION

(75) Inventors: Meir Rotshtein, Alei Zahav (IL); Omer Sharav, Rishon Le Zion (IL); Eyal Barlev, Hod Hasharon (IL)

(73) Assignee: SAP SE, Walldorf (DE)

( * ) Notice: Subject to any disclaimer, the term of this patent is extended or adjusted under 35 U.S.C. 154(b) by 289 days.

(21) Appl. No.: 13/298,910

(22) Filed: Nov. 17, 2011

(65) Prior Publication Data
US 2013/0132911 A1 May 23, 2013

(51) Int. Cl.
G06F 3/048 (2013.01)
G06F 17/30 (2006.01)

(52) U.S. Cl.
CPC .............................. G06F 17/30941 (2013.01)
USPC ........... 715/854; 715/738; 715/741; 715/824; 715/853

(58) Field of Classification Search
USPC .......................... 715/854, 738, 741, 824, 853
See application file for complete search history.

(56) References Cited

U.S. PATENT DOCUMENTS

| | | | |
|---|---|---|---|
| 6,209,009 B1 * | 3/2001 | Schwartz et al. | 715/201 |
| 7,437,686 B1 * | 10/2008 | Bernstein et al. | 715/853 |
| 7,669,147 B1 * | 2/2010 | Molander et al. | 715/854 |
| 8,010,909 B1 * | 8/2011 | Hanson et al. | 715/853 |
| 2002/0186260 A1 * | 12/2002 | Young | 345/853 |
| 2004/0010514 A1 * | 1/2004 | Agarwal et al. | 707/104.1 |
| 2008/0246988 A1 * | 10/2008 | Ashton | 358/1.15 |
| 2010/0042720 A1 | 2/2010 | Stienhans et al. | |
| 2010/0169477 A1 | 7/2010 | Stienhans et al. | |
| 2010/0169497 A1 | 7/2010 | Klimentiev et al. | |
| 2010/0299366 A1 | 11/2010 | Stienhans et al. | |
| 2011/0225484 A1 | 9/2011 | Lotan-Bolotnikoff et al. | |
| 2011/0252137 A1 | 10/2011 | Stienhans et al. | |

OTHER PUBLICATIONS

'On the Semantics of Heterogeneous Querying of Relational, XML and RDF Data with XSPARQL' [online]. Lopes et al., 2011, [retrieved on Nov. 16, 2011]. Retrieved from the Internet: <URL: http://axel.deri.ie/publications/lope-etal-2011EPIA.pdf>, 15 pages.
'Guide to multivalued fields' [online]. Microsoft, 2007, [retrieved on Nov. 9, 2011]. Retrieved from the Internet: <URL: http://office.microsoft.com/en-us/access-help/guide-to-multivalued-fields-HA001233722.aspx >, 6 pages.
'Demo: Lazy Loading Datastore used by dijit.Tree' [online]. Dojotoolkit, [retrieved on Nov. 16, 2011]. Retrieved from the Internet: <URL: http://download.dojotoolkit.org/release-1.0.2/dojo-release-1.0.2/dojox/data/demos/demo_LazyLoad.html>, 1 page.

(Continued)

*Primary Examiner* — Anil N Kumar
(74) *Attorney, Agent, or Firm* — Fish & Richardson P.C.

(57) ABSTRACT

A computer-implemented method for displaying a filterable hierarchy includes: receiving, in an application, a user input that requests at least part of a hierarchy to be displayed; generating a request based on the user input, and forwarding the request to a server for performing a query on non-hierarchical information in a database; receiving, in the application, a response by the server to the request; identifying, in the response, at least one selectable node in the hierarchy and at least one non-selectable visible node in the hierarchy; and presenting, using the application, a view in which the selectable node and the non-selectable visible node are structured according to the hierarchy.

10 Claims, 8 Drawing Sheets

(56) References Cited

OTHER PUBLICATIONS

'Tree Lazy Load Children' [online]. Dojo Toolkit, 2006, [retrieved on Nov. 16, 2011]. Retrieved from the Internet: <URL: http://dojo-toolkit.33424.n3.nabble.com/Tree-Lazy-Load-Children-td153499.html>, 7 pages.

'Efficiently selecting a tree in Linq-To-Sql' [online]. Stackoverflow, 2011, [retrieved on Nov. 16, 2011]. Retrieved from the Internet: <URL: http://stackoverflow.com/questions/1892752/ efficiently-selecting-a-tree-in-linq-to-sql>, 4 pages.

'Join (SQL)' [online]. Wikipedia, 2010, [retrieved on Nov. 16, 2011]. Retrieved from the Internet: <URL: http://web.archive.org/web/20100210013451/http:/en.wikipedia.org/wiki/Join_(SQL)>, 9 pages.

'Group by (SQL)' [online]. Wikipedia, 2008, [retrieved on Nov. 16, 2011]. Retrieved from the Internet: <URL: http://web.archive.org/web/20081101132640/http:/en.wikipedia.org/wiki/GROUP_BY>, 2 pages.

'SQL' [online]. Wikipedia, 2010. [retrieved on Nov. 16, 2011]. Retrieved from the Internet: <URL: http://web.archive.org/web/20101102040145/http:/en.wikipedia.org/wiki/SQL, 13 pages.

* cited by examiner

```xml
<c:SelectSpec xmlns:c="urn:com.versai:Bacon:Common.v1.0">
  <c:RemoteView>
    <c:AccountName/>
    <c:AppName/>
    <c:CollectionPath>Locations</c:CollectionPath>
  </c:RemoteView>
  <c:ReturnField fieldXPath="" aggregateDefinitionIndex="1"/>
  <c:ReturnField fieldXPath="" collectionQueryIndex="2" groupByIndex="2" uiExpressionMode="DataFieldMode"/>
  <c:ReturnField fieldXPath="" collectionQueryIndex="2" groupByIndex="2" uiExpressionMode="DataFieldMode"/>
  <c:ReturnField fieldXPath="" collectionQueryIndex="2" groupByIndex="1" uiExpressionMode="DataFieldMode"/>
  <c:ReturnField fieldXPath="" collectionQueryIndex="2" groupByIndex="3" uiExpressionMode="DataFieldMode"/>
  <c:ReturnField fieldXPath="" collectionQueryIndex="2" groupByIndex="4" uiExpressionMode="DataFieldMode"/>
  <c:GroupBy fieldXPath="$doc2Prop/Properties/ID" collectionQueryIndex="2"/>
  <c:GroupBy fieldXPath="Record/Locations/ancestors" collectionQueryIndex="2"/>
  <c:GroupBy fieldXPath="Record/Locations/name" collectionQueryIndex="2"/>
  <c:GroupBy fieldXPath="Record/Locations/fullName" collectionQueryIndex="2"/>
  <c:CollectionQuery>
    <c:AccountName/>
    <c:AppName/>
    <c:CollectionPath>Locations</c:CollectionPath>
  </c:CollectionQuery>
  <c:CollectionQuery>
    <c:AccountName/>
    <c:AppName/>
    <c:CollectionPath>Locations</c:CollectionPath>
  </c:CollectionQuery>
  <c:Condition>( $doc2Prop/*:Properties/*:ID = $doc1/*:Locations/*:ancestors ) and ( (string-length( $doc1/*:Locations/*:allowedUser )=0) or
$Context/*:Context/*:MemberID = $doc1/*:Locations/*:allowedUser ) ) and $doc2/*:Locations/*:ancestors[2] = '47c77278-6bf2-11e0-fa8d-
c0a12cb744bb'</c:Condition>
  <c:AggregateDefinition>
    <c:Name>agg0</c:Name>
    <c:Function>min</c:Function>
    <c:Expression>abs(compare( $doc1Prop/Properties/ID , $doc2Prop/Properties/ID ))</c:Expression>
  </c:AggregateDefinition>
</c:SelectSpec>
```

FIG. 4

```xml
<ns1:GetViewContentsResponse>
<ns1:ResultSetID>36c3d867-0ba3-11e1-b97b-5bf99653e38e</ns1:ResultSetID>
<ns1:ResultSetSize>2</ns1:ResultSetSize>
<ns1:QueryExecutionCompleted>true</ns1:QueryExecutionCompleted>
<ns1:ChunkOffset>1</ns1:ChunkOffset>
<ns1:ViewHeader>
<ns1:ColumnDef>
<ns1:AggregateDefinition>
<ns1:Name>AggDef1</ns1:Name>
</ns1:AggregateDefinition>
</ns1:ColumnDef>
<ns1:ColumnDef>
<ns1:AggregateDefinition>
<ns1:Name>GroupBy2</ns1:Name>
</ns1:AggregateDefinition>
</ns1:ColumnDef>
<ns1:ColumnDef>
<ns1:AggregateDefinition>
<ns1:Name>GroupBy1</ns1:Name>
</ns1:AggregateDefinition>
</ns1:ColumnDef>
<ns1:ColumnDef>
<ns1:AggregateDefinition>
<ns1:Name>GroupBy3</ns1:Name>
</ns1:AggregateDefinition>
</ns1:ColumnDef>
<ns1:ColumnDef>
<ns1:AggregateDefinition>
<ns1:Name>GroupBy4</ns1:Name>
</ns1:AggregateDefinition>
</ns1:ColumnDef>
</ns1:ViewHeader>
<vGVC:Row>
<vGVC:Column>
<vGVC:Value>0</vGVC:Value>
<vGVC:ObjectName/>
</vGVC:Column>
<vGVC:Column>
<vGVC:Value>
<REPEATING><V>47c772aa-6bf2-11e0-fa8d-c0a12cb744bb</V><V>47c77278-6bf2-11e0-fa8d-c0a12cb744bb</V></REPEATING>
</vGVC:Value>
<vGVC:ObjectName/>
</vGVC:Column>
<vGVC:Column>
<vGVC:Value>47c772aa-6bf2-11e0-fa8d-c0a12cb744bb</vGVC:Value>
<vGVC:ObjectName/>
</vGVC:Column>
<vGVC:Column>
<vGVC:Value>Daihatsu</vGVC:Value>
<vGVC:ObjectName/>
</vGVC:Column>
```

FIG. 5A

```
<vGVC:Column>
<vGVC:Value>Toyota ? Daihatsu</vGVC:Value>
<vGVC:ObjectName/>
</vGVC:Column>
<vGVC:ModifiedAfterQuery>false</vGVC:ModifiedAfterQuery>
</vGVC:Row>
<vGVC:Row>
<vGVC:Column>
<vGVC:Value>1</vGVC:Value>
<vGVC:ObjectName/>
</vGVC:Column>
<vGVC:Column>
<vGVC:Value>
<REPEATING><V>f4914da7-7654-11e0-c3f8-860e01a7f972</V><V>47c77278-6bf2-11e0-fa8d-
c0a12cb744bb</V></REPEATING>
</vGVC:Value>
<vGVC:ObjectName/>
</vGVC:Column>
<vGVC:Column>
<vGVC:Value>f4914da7-7654-11e0-c3f8-860e01a7f972</vGVC:Value>
<vGVC:ObjectName/>
</vGVC:Column>
<vGVC:Column>
<vGVC:Value>Toyota Celica</vGVC:Value>
<vGVC:ObjectName/>
</vGVC:Column>
<vGVC:Column>
<vGVC:Value>Toyota ? Toyota Celica</vGVC:Value>
<vGVC:ObjectName/>
</vGVC:Column>
<vGVC:ModifiedAfterQuery>false</vGVC:ModifiedAfterQuery>
</vGVC:Row>
</ns1:GetViewContentsResponse>
```

FIG. 5B

CLIENT-SIDE GENERATION AND FILTERING OF HIERARCHY INFORMATION

TECHNICAL FIELD

This document relates to client-side generation and filtering of hierarchy information.

BACKGROUND

Information can be organized as a hierarchy in many different situations. For example, products from a manufacturer and/or components of such products can be structured as a tree where each node except a root node has a parent node.

When tree information is to be displayed at a client device, an approach called "lazy load" is sometimes used. For example, a lazy load can mean that only the part(s) of the tree that are currently to be visible are actually retrieved from the server. That is, for any parent node that is currently not expanded, its child nodes are not retrieved. If and when the parent node is expanded, the lazy load retrieves the child node(s). However, lazy load may require that the server side is aware of the hierarchical nature of the information, and further filtering of the retrieved nodes may not be provided.

SUMMARY

The invention relates to client-side generation and filtering of hierarchy information.

In a first aspect, a computer-implemented method for displaying a filterable hierarchy includes: receiving, in an application, a user input that requests at least part of a hierarchy to be displayed; generating a request based on the user input, and forwarding the request to a server for performing a query on non-hierarchical information in a database; receiving, in the application, a response by the server to the request; identifying, in the response, at least one selectable node in the hierarchy and at least one non-selectable visible node in the hierarchy; and presenting, using the application, a view in which the selectable node and the non-selectable visible node are structured according to the hierarchy.

In a second aspect, a computer program product is tangibly embodied in a computer-readable storage medium and includes instructions that when executed by a processor perform a method for displaying a filterable hierarchy. The method includes: receiving, in an application, a user input that requests at least part of a hierarchy to be displayed; generating a request based on the user input, and forwarding the request to a server for performing a query on non-hierarchical information in a database; receiving, in the application, a response by the server to the request; identifying, in the response, at least one selectable node in the hierarchy and at least one non-selectable visible node in the hierarchy; and presenting, using the application, a view in which the selectable node and the non-selectable visible node are structured according to the hierarchy.

In a third aspect, a system includes: one or more processors; and a computer program product tangibly embodied in a computer-readable storage medium and comprising instructions that when executed by the one or more processors perform a method for displaying a filterable hierarchy. The method includes: receiving, in an application, a user input that requests at least part of a hierarchy to be displayed; generating a request based on the user input, and forwarding the request to a server for performing a query on non-hierarchical information in a database; receiving, in the application, a response by the server to the request; identifying, in the response, at least one selectable node in the hierarchy and at least one non-selectable visible node in the hierarchy; and presenting, using the application, a view in which the selectable node and the non-selectable visible node are structured according to the hierarchy.

Implementations can include any or all of the following features. The non-hierarchical information in the database includes a plurality of entries each having a multivalued field, and the multivalued fields are used in the application for structuring the selectable node and the non-selectable visible node according to the hierarchy. The request calls for at least first and second records to be generated from the non-hierarchical information, the first record corresponds to nodes of the hierarchy filtered for a user, including the selectable node, and the second record corresponds to parent nodes to the nodes in the first record. The view presents the hierarchy opened to a number of levels based on the user input. The user input corresponds to a user expanding a node in the hierarchy. Another view of the hierarchy was previously presented, the other view filtered for a user, and the user input is generated by the user and corresponds to initiating another filtering of the hierarchy. An administrator specifies that the selectable node is selectable by assigning a user identifier to the selectable node, and a node having no assigned user identifier is selectable by all users who have access to the hierarchy. The non-hierarchical information in the database includes a plurality of entries each having a multivalued field, and the multivalued fields are used in structuring the selectable node and the non-selectable visible node according to the hierarchy.

Implementations can provide any or all of the following advantages. A filtered tree can be displayed up to an arbitrary level while obtaining: a minimum amount of network traffic; a minimum use of client resources (e.g., processor or memory); the tree structure is maintained; the filter criteria can be changed by the user or defined according to a user role; any previous node selection in the tree is displayed, as are its parents and any node along the path to the selected node that meets the filter criteria; the user can apply further filtering on top of the filter that was done when the current tree was displayed; and/or compressed paths can be used when there is a direct path to the next filtered child node.

The details of one or more implementations are set forth in the accompanying drawings and the description below. Other features and advantages will be apparent from the description and drawings, and from the claims.

DESCRIPTION OF DRAWINGS

FIG. 4 shows an example of a request sent from a client side to a server.

FIGS. 5A-B show an example of a response sent from the server to the client side.

Like reference symbols in the various drawings indicate like elements.

DETAILED DESCRIPTION

This description relates to client-side generation and filtering of hierarchy information. For example, data can be stored in a database in a non-hierarchical fashion, for example as individual rows in a database table. A client application that should display a tree structure can then generate a query for a database server, and from the delivered results the client application can assemble the requested information according to the tree structure. That is, this can eliminate a need to introduce client-specific features in the server, for example such that the server logic need not be aware that the stored information is to be structured in tree form.

Figure 1:
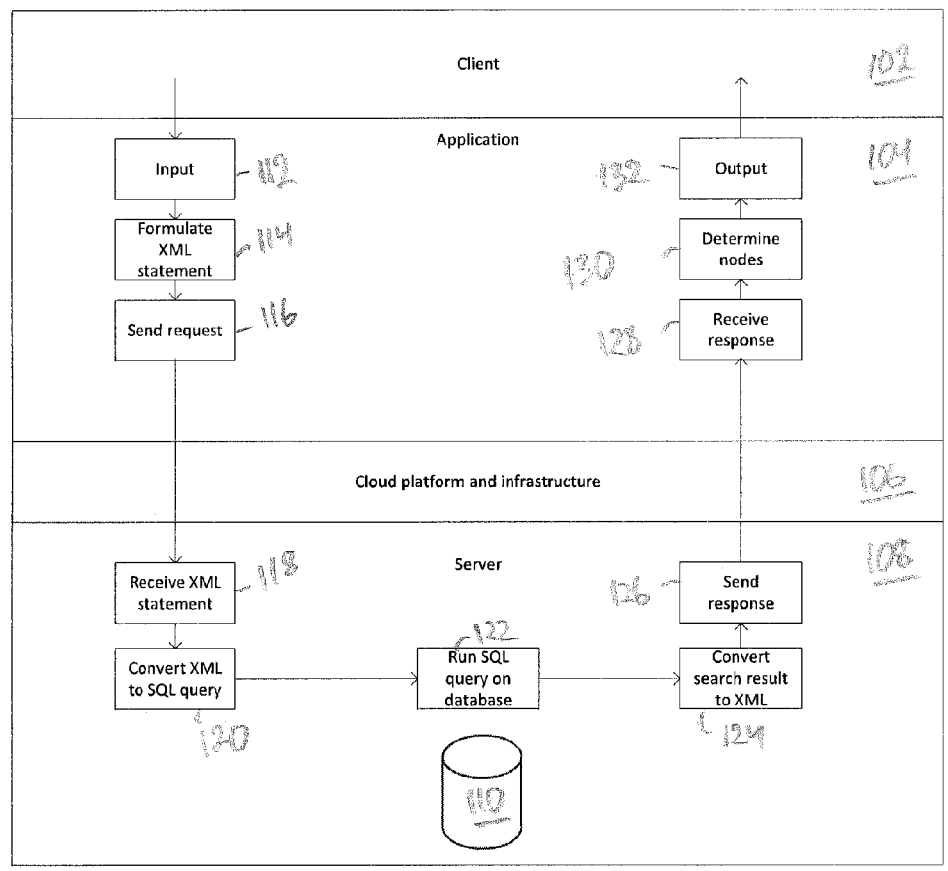
FIG. 1 shows an example cloud architecture that can provide filtering of a hierarchy.

FIG. 1 shows an example cloud architecture 100 that can provide filtering of a hierarchy. Here, the cloud architecture is schematically organized into a client layer 102, an application layer 104, a cloud platform and infrastructure layer 106 and a server and database layer 108. One or more other layers can also or alternatively be used.

The client layer 102 and the application layer 104 can be considered the client-side aspects of the cloud architecture 100. The client layer 102 can include any form of client device or module including, but not limited to, a browser or other program executed on a personal computer or on a smartphone. The application layer 104 can include one or more applications created for interaction with the client layer 102. For example, the application layer can include an application that it makes available to each of multiple users according to the cloud computing paradigm that is sometimes used to provide services over a network. The cloud architecture 100 can use any type of computer network, for example a private network or a public network.

The cloud platform and infrastructure layer 106 can facilitate the operations of one or more applications in the application layer 104, such as to provide services over the internet. The cloud platform and infrastructure layer can expose services to the application layer that the applications can use to process or retrieve information. For example, such services can relate both to the substantive operations of the application (s) and to the communications (e.g., by a secure login) to and from the users.

The server layer 108 in this example maintains at least one data base 110. In some implementations, the database has stored therein non-hierarchical information, for example in form of basic relational-database tables. The server layer executes server logic that is responsible for storing information in the database 110, receiving requests from one or more applications, querying the database, and providing responses to the requests. For example, the server logic can implement a database management system that is configured for querying the database, such as by structured query language (SQL).

An example of operations in the cloud architecture 100 will now be described. The example involves a tree structure that an application in the application layer 104 displays to a user in the client layer 102, for example in a form filtered to that user. At 112, the application layer 104 receives an input from the client layer 102. For example, the user chooses to expand a currently unexpanded node. In this example, expanding a node requires that more information be obtained from the database 110, such as in the following way.

At 114, the application formulates an XML (extensible markup language) statement that is based on the input. For example, the application can create the XML statement so that it corresponds to a suitable database query. Such database query can in turn reflect the current situation that a currently unexpanded node should be expanded, and one or more of its child nodes should be displayed. At 116, the application sends the request for receipt in the server layer 108.

At 118, a server in the server layer 108 receives the XML statement as part of the request. At 120, the server converts the XML statement to a database query, for example an SQL query. That is, the SQL query then reflects what information should be retrieved so that the currently unexpanded node can be displayed in expanded form.

At 122, the server runs the query (e.g., SQL) on the database 110. An SQL query can be formulated to include one or more select, from, where, group by, having or order by statements, to name just a few examples. In some implementations the query involves a self-join and group by statements, as will be described below. In any event, the information on which the query is executed is non-hierarchical; that is, the server logic is not aware of any hierarchical structure among the various data portions.

At 124, the search result is converted to XML, for example by essentially the reverse of the conversion performed at 120. A response to the request is sent at 126, the response including the XML statement generated for the requesting application.

At 128, the response is received in the application layer 108. The application uses the response at 130 to determine at least one selectable node and a non-selectable visible node in relation to the particular user input (received at 112). Examples of this will be described below.

At 132, the application generates an output to the client layer 102. In some implementations, the application can forward code or other information for receipt by a browser, wherein the browser uses the code or other information to display a view of the hierarchy. In the current example, the output is used to display the node in an expanded state, and the displayed view accordingly now also includes one or more child nodes that were not displayed before the expansion. For example, a current node and a condition for visibility/selectability of nodes are input from the client side, and the response provides the list of children that either meet the filter condition(s), or that have direct children—or indirect children at an arbitrary level—that meet the filter condition(s). The expansion of the hierarchy is accomplished with a single roundtrip to the server, based on a query formulated by the client application. This can tend to minimize network traffic while utilizing lazy load to support large data structures that cannot entirely be kept at the client side.

A similar processing can be performed whenever a hierarchy is to be displayed or refreshed. For example, a hierarchy can be displayed such that the tree is opened to N (i.e., an arbitrary number) of levels. The number of levels to be opened can be set based on one or more factors, for example a user preference or a user role specification. As another example, an additional query can be run on top of the query that is currently the basis for the tree.

Figure 2A:
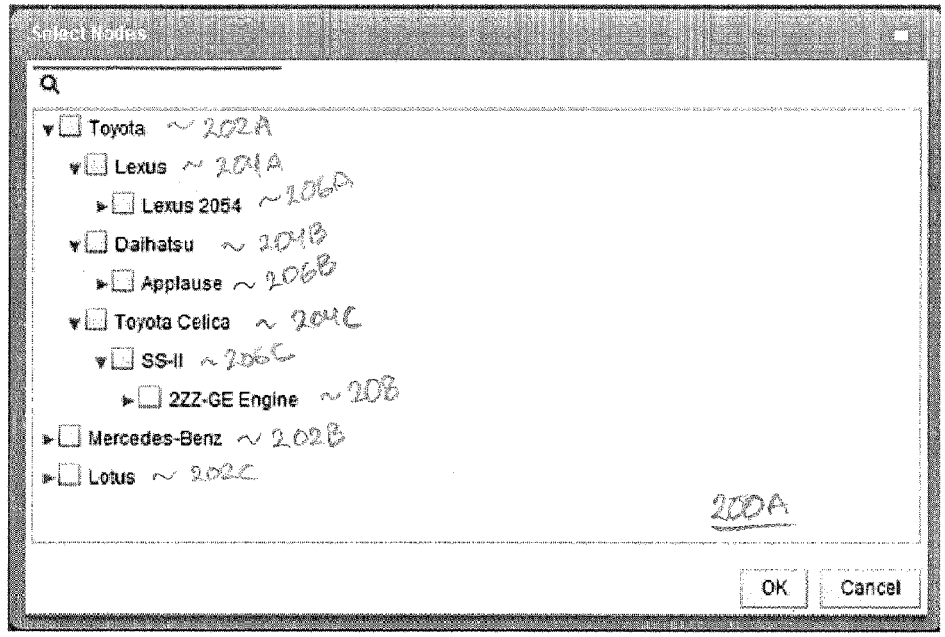
FIGS. 2A-C show examples of selectable nodes and non-selectable visible nodes.
Figure 2B:
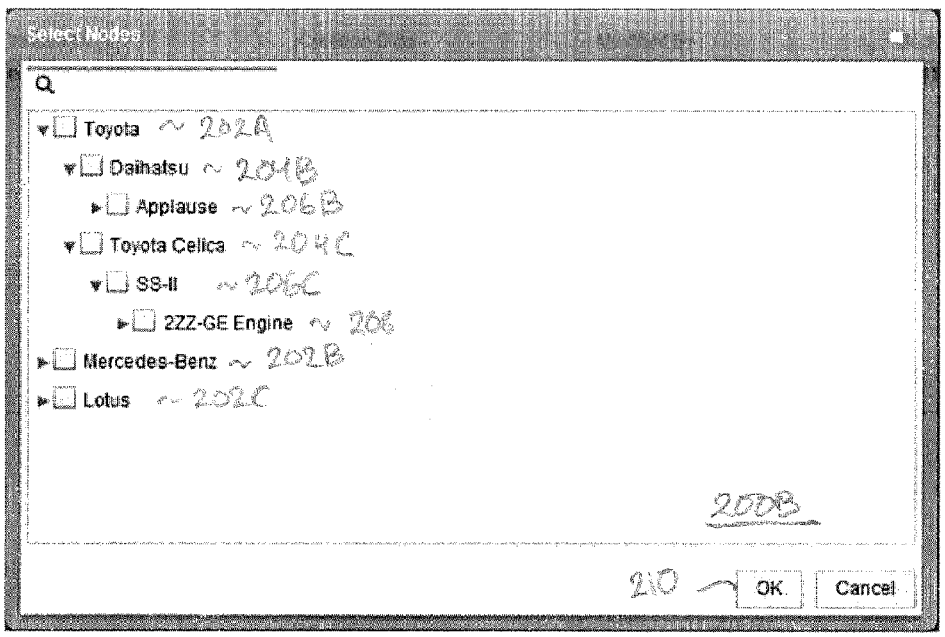
Figure 2C:
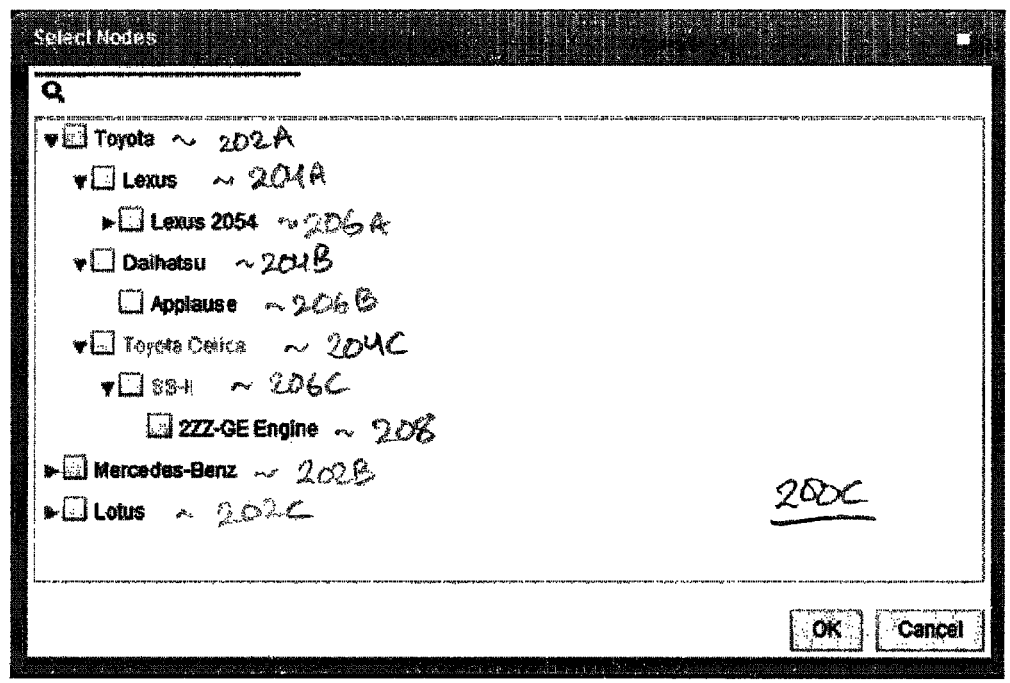

FIGS. 2A-C show examples of selectable nodes and non-selectable visible nodes. Particularly, FIG. 2A shows a "select nodes" view 200A for an administrator; FIG. 2B shows a select nodes view 200B for a first user (here referred to as "Engineer1"); and FIG. 2C shows a select nodes view 200C for a second user (here referred to as "Engineer2"). These views all relate to the same underlying hierarchy, which in this example is a tree of car makes, models and components. For clarity, the hierarchy that is the basis for the views 200A-C shows only a few car manufacturers, and only a limited set of car models from those car makers. Moreover, while a great number of components are part of each of these cars, only a few example components are shown. In some implementations, the hierarchy can have significantly more levels than shown here, and/or can have many more components at each level.

In the administrator's view 200A the hierarchy is shown in its entirety. The hierarchy includes three car makes Toyota, Mercedes-Benz and Lotus, represented by nodes 202A-C, respectively. The Toyota car make here has three models listed: Lexus, Daihatsu and Toyota Celica, represented by nodes 204A-C, respectively.

Each of the car model nodes 204A-C can have zero or more child nodes. Here, the Lexus model has a child represented by node 204A which is called "Lexus 2054"; the "Applause" child of the Daihatsu model has node 206B; and the "SS-II" child of the Toyota Selica model has node 206C. Moreover, each of the nodes 206A-C may have zero or mode child nodes. Here, only the node 206C is currently expanded, and a node 208 called "2ZZ-GE Engine" is therefore displayed.

For each node in the hierarchy, the administrator can decide whether the node should be selectable by all users with access to the hierarchy, or only selectable to certain users. Such restriction can be specified in any of multiple ways, including but not limited to, by user identity, user organization, or user role, to name just a few examples. In this example, the administrator specifies the node selectability to be as follows:

| Node number | Node name | Is selectable to |
| --- | --- | --- |
| 202A | Toyota | All users with access |
| 204A | Lexus | Engineer2 |
| 206A | Lexus 2054 | Engineer2 |
| 204B | Daihatsu | All users with access |
| 206B | Applause | All users with access |
| 204C | Toyota Celica | Engineer1 |
| 206C | SS-II | Engineer1 |
| 208 | 2ZZ-GE Engine | All users with access |
| 202B | Mercedes-Benz | All users with access |
| 202C | Lotus | All users with access |

In other words, the selectability is here restricted in at least two specific ways. First, the nodes 204A and 206A, which correspond to an entire branch under the Toyota node 202A, are selectable only to Engineer1. That is, these nodes are not selectable to any other user according to this specification. Second, the leaf node 208 is selectable to all users with access to the hierarchy, although its nearest parent nodes—the SS-II node 206C and the Toyota Celica node 204C—are only selectable to Engineer1. That is, this is an example where the beginning of a branch is selectable only to a specific user, while a deeper node in the same branch is selectable to a larger group of users. The above two restrictions will affect how the hierarchy is displayed to users, particularly to Engineer1 and Engineer2 in this example.

FIG. 2B shows the select nodes view 200B for Engineer1. For example, a filtering of a large hierarchy is performed based on who the user is (or what the current work task is, etc.) and this filtered result forms the basis for generating the view 200B. In some situations, one or more nodes that do not meet the filtering criterion may also be displayed, for example because they are the parent node of a selectable node.

Here, the view 200B includes the nodes 202A, 204B, 206B, 204C, 206C, 208, 202B and 202C. For clarity, all the displayed nodes are here shown as expanded, although this can be modified by the user or depending on the particular situation. The shown nodes are all selectable to Engineer1 according to the administrator specification and they are therefore displayed with normal (i.e., not grayed-out) appearance. However, the nodes 204A and 206A (FIG. 2A), which were restricted as only selectable by another user, are not displayed with the hierarchy. This is because those nodes are an entire branch under the Toyota parent node 202A. For example, it can be assumed that Engineer1 does not have a strong need to see either of the nodes 204A and 206A in such situation. However, the remainder of the hierarchy structure is preserved for Engineer1 in this view, which can help this user understand the relationships between the different nodes that are selectable. The user (here Engineer1) can select one or more of the selectable nodes and then click an OK button 210. The user can make this selection for any of multiple purposes including, but not limited to, the ordering of a product, component or part, or to document work that has been performed regarding such item.

Additional filtering can be performed. In some implementations, the user can run a new filtering on top of the one that was the basis for the current version of the view 202B. For example, Engineer1 may initially have received a first set of filtered nodes, and may later decide to run additional filtering that is more, or less, encompassing than the first set of nodes, or that seeks an entirely different set of nodes.

FIG. 2C, in turn, shows the select nodes view 200C for Engineer2. Here, the view 200C includes the nodes 202A, 204A, 206A, 204B, 206B, 204C, 206C, 208, 202B and 202C. One difference compared to Engineer1's view is that the nodes 204A and 206A are here displayed. This is a result of the administrator specification described earlier. Moreover, these nodes were specified as selectable to Engineer2 and therefore have normal appearance.

However, not all of the displayed nodes are selectable to Engineer2. Particularly, the nodes 204C and 206C are here grayed-out as an indication that they are not selectable by this user. This is also a result of the administrator specification described earlier. However, the leaf node 208 has been specified as selectable by all users with access (and therefore by Engineer2), and this node therefore has a normal appearance like other selectable nodes.

That is, the view 202C in this example has preserved the hierarchy structure when a deeper node (here the leaf node 208) is currently selectable although one or more of its parent nodes are not. Preserving the hierarchy structure can help the user understand the context of a selectable node and avoid confusion with other nodes that may have similar names. Also, the preserved hierarchy structure can allow the user to collapse or expand a tree branch at will, which can be useful, for example, when only a few leaf nodes are selectable out of an otherwise complex branch of nodes.

The entire hierarchy structure is not necessarily preserved in the displayed view, however. Take for example the view 200B (FIG. 2B) which is displayed to Engineer1. This view omits the entire branch of nodes 204A and 206A (shown in FIG. 2A), for example because it is assumed that the current user (here Engineer1) does not have a great need to see branches in which that user cannot select any node, and showing such non-selectable nodes could perhaps make the view more difficult to use. That is, in each displayed view the hierarchy structure can be preserved in some parts and omitted in other parts. Moreover, in the preserved parts the nodes can be marked differently (e.g., greyed-out) to indicate the difference between a selectable node and a non-selectable visible node.

Figure 3:
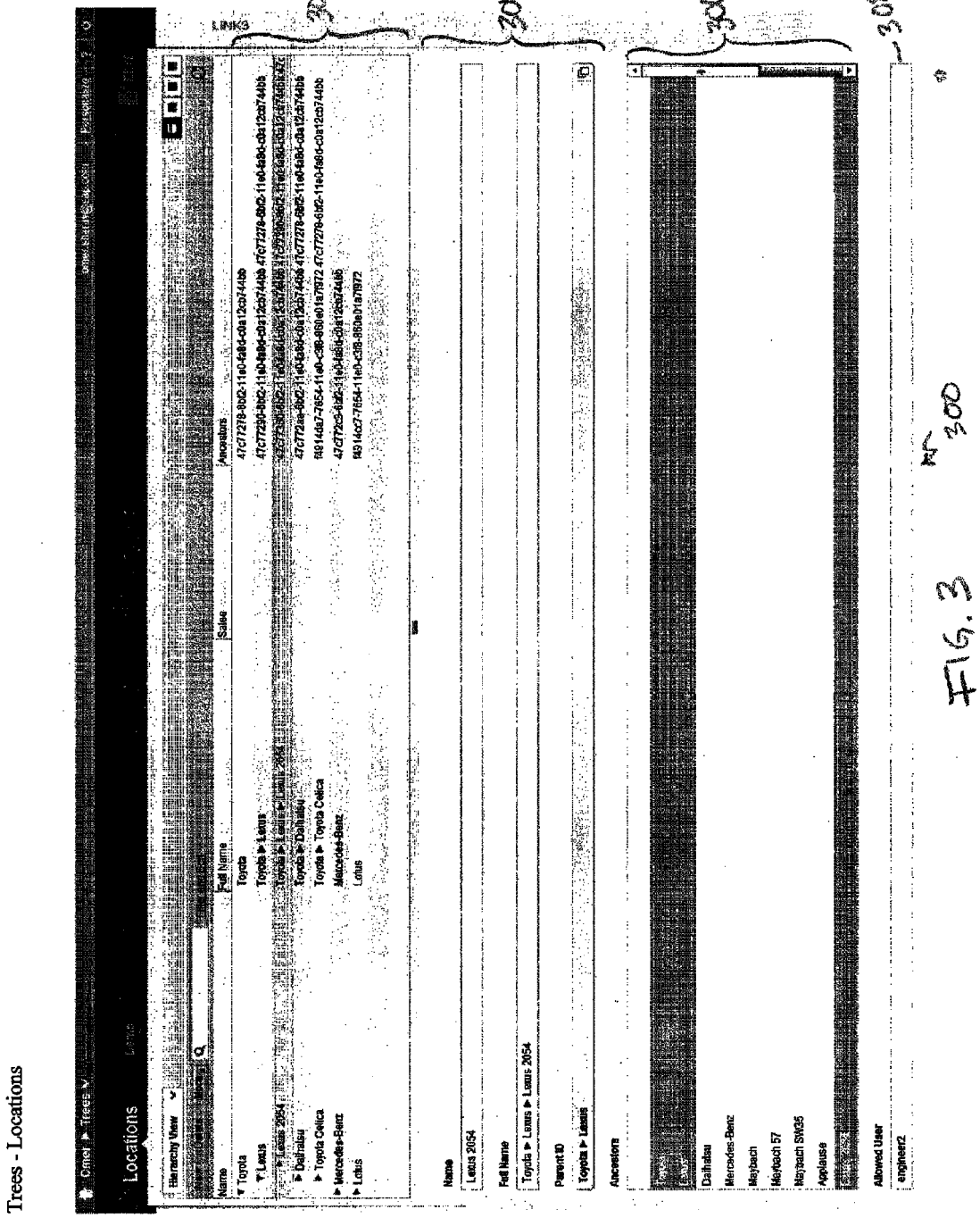
FIG. 3 shows an example view for specifying selectable nodes and non-selectable visible nodes.

FIG. 3 shows an example view 300 for specifying selectable nodes and non-selectable visible nodes. In some implementations, an administrator can use the view 300 to specify selectability and/or non-selectability of one or more nodes, for example as described above.

The view 300 includes a nodes area 302, which can specify one or more characteristics of each node. Here, the node's name, full name and ancestors are listed in respective columns. Other information can additionally or instead be shown, including, but not limited to, a node identifier, node type, or relevant statistics. In some implementations, the nodes area 302 can be displayed in any of multiple modes, currently a "Hierarchy View," which shows the hierarchy structure of the tree by organizing the nodes in a particular order and by using horizontal indents for child nodes.

In this example, the nodes shown in the nodes area 302 generally correspond to those described above. Currently, a "Lexus 2054" node has focus in the nodes area 302.

The view 300 includes a node editing area 304, which is used to enter, edit and/or remove information about the node in focus. Here, the node editing area includes a name field, a full name field and a parent ID field. For example, the parent ID field can be used to reassign the node in focus from its current parent node to another parent node. The full name field can then be updated accordingly to reflect the change.

The view 300 includes an ancestors area 306 which indicates the node in focus and which, if any, of the other nodes that are parents to that node either directly or indirectly. This corresponds to the information in the ancestors column of the nodes area 302. Here, the ancestors area 306 shows that "Toyota" and "Lexus" are the ancestors.

The view 300 includes an allowed user area 308 where the selectability or non-selectability of one or more nodes can be specified. In some implementations, the administrator leaves the allowed user area blank to make the node selectable to all users with access to the hierarchy. That is, general selectability can be the default setting for each node. In contrast, the administrator can enter one or more user names, IDs, groups and/or roles to restrict the selectability accordingly. As described in examples above, a node that is non-selectable to a current user is either displayed to that user (e.g., the nodes 204C and 206C are displayed in FIG. 2C), or not displayed to that user (e.g., the nodes 204A and 206A are not displayed in FIG. 2B).

FIG. 4 shows an example of a request 400 sent from a client side to a server. In some implementations, the request 400 is sent from the application layer 104 (FIG. 1) to the server layer 108. The request can be formulated using any suitable code, script or other language. In some implementations, the client side formulates the request using an intermediary language which is later converted to a query language (e.g., SQL) for execution on a database. Here, the request 400 is formulated in XML. For simplicity, the following description of the XML statements will occasionally describe the execution of the query, or the results thereof, it being implied that the request language has then first been translated into a proper query language.

The request 400 in this example is one that is sent when a user expands the Toyota node 202A (FIGS. 2A-C). Particularly, in the nodes area 302 (FIG. 3), the ancestors column contains the identifier for the node 202A. That is, because the node 202A is the root node in this example, only its own ID—and no ancestor IDs—are listed in the ancestors column. In contrast, a child node such as the Lexus node (204A in FIG. 2A) has first its own ID listed in the ancestor column, and thereafter the ID of its parent(s), in this example the ID of the Toyota node.

The request 400 includes a condition 402. In some implementations, a condition is used in the determination of whether a node should be displayed as a selectable node, as a non-selectable visible node, or not be displayed at all. Here, the condition 400 has the following structure:

condition 402A
      AND
    condition 402B
      AND
    condition 402C wherein the conditions are associated by logical AND operators. Moreover, the condition 402B here contains a logical OR operator, as will be discussed later.

The condition 402A relates to whether a node is obtained through filtering or because the node is an ancestor of a node that is obtained through the filtering. Particularly, the request 400 generates two records, or documents, sometimes called "copies" of the database table. They are here referred to as $doc1 and $doc2, respectively. The $doc1 contains nodes that match the filtering criteria; that is, the nodes that an administrator has specified should be selectable by (at least) this particular user. The $doc2, in contrast, contains the nodes that are ancestors of the nodes in $doc1.

In this example, the equal sign (=) in the condition 402A describes a one-to-many relation. That is, of the terms in the condition 402A, "ID" is here a single value while "ancestors" is a multivalued (or "repeating") field. In some implementations, one-to-many relations can instead be described using an "in" expression.

The condition 402B relates to the selectability of the node for a given user. Here, the condition 402B has a first section that determines whether the string length of allowed users is zero. For example, when the default setting is that specifying no particular allowed user leads to the node being generally selectable, then a zero string length corresponds to that situation. The condition 402B also has a second portion associated to the first portion by a logical OR operator. The second portion determines whether the ID of the current user (here called "MemberID") is specified in the allowed-user field. In either of these situations, the particular node should be selectable by the current user and the node can therefore be displayed with normal appearance.

In some implementations, the condition 402B is completely configurable by an administrator. The condition 402B can rely on data, or user permissions, or both, to name just a few examples.

The condition 402C, finally, relates to the current node being the child of the particular node being expanded (in this example the Toyota node).

The request 400 also includes a group by portion 404 that relates to compressing the hierarchy to what is currently of interest. That is, the group by portion 404 can ensure that any specific node occurs in the $doc2 only once. Otherwise, a node could appear twice in the $doc2: first because the node itself is a filtered node, and then because it is a parent node to another filtered node.

The request 400 also includes an aggregation portion 406. For example, if the same node appears both in $doc1 and in $doc2, then the aggregation informs the system that the node in $doc2 is not a direct child node of an expanded parent node, but rather a filtered node (i.e., a node that met the filtering criteria).

FIGS. 5A-B show an example of a response 500 sent from the server to the client side. The response 500 is here written in XML code. In some implementations an SQL query is performed in the database 110 (FIG. 1) and the result is converted to a suitable form—e.g., XML—before sending the response to the client side.

The response 500 includes a group by portion 502. In this example, the group by portion relates to the group by portion 404 (FIG. 4).

The response 500 includes IDs of nodes. For example, ID 504 corresponds to the Daihatsu node 204 B (FIGS. 2A-C), and ID 506 corresponds to its parent node, the Toyota node 202A (FIGS. 2A-C). For example, these nodes occur in the Full Name field of the node editing area 304 (FIG. 3) when the Daihatsu node has focus in the nodes area 302. The response also includes an ID 508 that is also the ID of the Daihatsu node (i.e., the same as ID 504). For example, this node occurs in the Name field of the node editing area 304 (FIG. 3) when the Daihatsu node has focus in the nodes area 302. The response also includes the name "Daihatsu" (at 510) and the two names "Toyota" and "Daihatsu" (at 512).

At 514, the response 500 includes corresponding information about the Toyota Celica node, which has the same parent node.

A value 514 for the Daihatsu node is "0" in this example, while a corresponding value 516 for the Toyota Celica node is "1". The "0" value indicates that the Daihatsu node is present because it meets the filtering criteria for the current user; that is, this node is selectable. The "1" value, on the other hand, indicates that the Toyota Celica node is present—not for meeting the filtering criteria, but rather—because it has a child node (direct or indirect) that meets the criteria. For example, this corresponds to the situation in FIG. 2C, where the Toyota Celica node 204C is present because it has the deeper node 208 that is selectable to this user.

Figure 6:
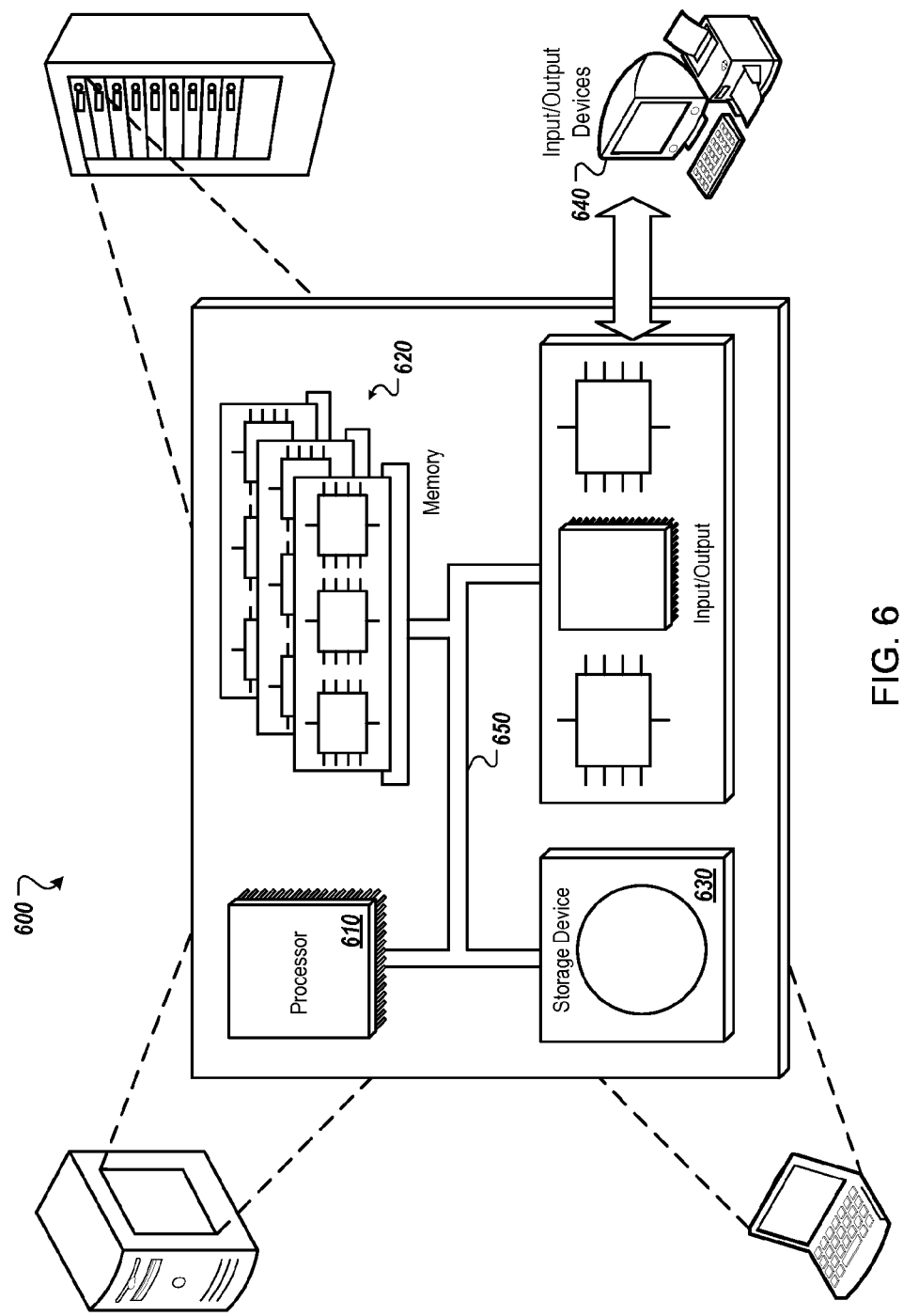
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit in some implementations and is a non-volatile memory unit in other implementations.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
providing, by a computing system with which users are able to register as a first type of user, a second type of user, and as an administrator, a display of a particular hierarchy of nodes, in its entirety, to the administrator in a particular user interface, wherein some nodes in the particular hierarchy of nodes are parent nodes and other nodes in the particular hierarchy of nodes are child nodes to respective ones of the parent nodes;

receiving, by the computing system, user input that interacts with the particular user interface to specify that:
(i) a first collection of nodes in the particular hierarchy of nodes are to be displayed as selectable by only the first type of user, including at least one of the parent nodes and at least one of the child nodes,
(ii) a second collection of nodes in the particular hierarchy of nodes are to be displayed as selectable by only the second type of user, including one or more of the parent nodes and one or more of the child nodes, and
(iii) a third collection of nodes in the particular hierarchy of nodes are to be displayed as selectable by both the first type of user and the second type of user, including multiple of the parent nodes and multiple of the child nodes, and wherein a particular child node from the third collection of nodes is a child node to a certain parent node from the first collection of nodes;

receiving, by the computing system, a first request by the first type of user to view a first display of the particular hierarchy of nodes on a first computing device, and in response sending, by the computing system, a first response that includes information for causing the first computing device to present the first display of the particular hierarchy of nodes, wherein the first display of the particular hierarchy of nodes:
(i) presents the first collection of nodes that the administer specified to be displayed as selectable by only the first type of user, including the at least one of the parent nodes and the at least one of the child nodes,
(ii) presents the third collection of nodes that the administrator specified to be displayed as selectable by both the first type of user and the second type of user, including the multiple of the parent nodes and the multiple of the child nodes, and
(iii) omits from display the second collection of nodes that the administrator specified to be displayed as selectable by only the second type of user; and receiving, by the computing system, a second request by the second type of user to view a second display of the particular hierarchy of nodes on a second computing device and in response sending, by the computing system, a second response that includes information for causing the second computing device to present the second display of the particular hierarchy of nodes, wherein the second display of the particular hierarchy of nodes:
(i) presents the second collection of nodes that the administrator specified to be displayed as selectable by only the second type user, including the one or more of the parent nodes and the one or more of the child nodes,
(ii) presents the third collection of nodes that the administrator specified to be displayed as selectable by both the first type of user and the second type of user, including the multiple of the parent nodes and the multiple of the child nodes, and further including a presentation of the particular node that is the child node to the certain parent node,
(iii) presents the certain parent node from the first collection of nodes that the administrator specified to be displayed as selectable by only the first type of user,
(iv) omits nodes in the first collection of nodes other than the certain parent node from presentation, and
(v) presents the particular node in a particular manner to indicate that the articular node is selectable, and presents the certain parent node in a manner that is different than the particular manner in order to indicate that the certain parent node is non-selectable.

2. The computer-implemented method of claim 1, wherein the first request was sent for receipt by the computing system in response to user selection of one of the nodes in the particular hierarchy of nodes that was being displayed in a collapsed manner.

3. The computer-implemented method of claim 1, wherein the first display of the particular hierarchy of nodes presents the particular node in the particular manner to indicate that the particular node is selectable, and presents the certain parent node in the particular manner to indicate that the certain parent node is selectable.

4. The computer-implemented method of claim 1, wherein presenting the certain parent node in the manner that is different than the particular manner includes displaying the certain parent node greyed out.

5. The computer-implemented method of claim 1, wherein the first type of user is identified as being the first type of user based on the first type of user having a particular user name, having a particular identifier, belonging to a certain group, or having a certain role.

6. A system comprising:
one or more processors; and
non-transitory computer-readable storage medium comprising instructions that, when executed by a processor, cause performance of a method that comprises:
providing, by a computing system with which users are able to register as a first type of user, a second type of user, and as an administrator, a display of a particular hierarchy of nodes, in its entirety, to the administrator in a particular user interface, wherein some nodes in the particular hierarchy of nodes are parent nodes and other nodes in the particular hierarchy of nodes are child nodes to respective ones of the parent nodes;
receiving, by the computing system, user input that interacts with the particular user interface to specify that:
(i) a first collection of nodes in the particular hierarchy of nodes are to be displayed as selectable by only the first type of user, including at least one of the parent nodes and at least one of the child nodes,
(ii) a second collection of nodes in the particular hierarchy of nodes are to be displayed as selectable by only the second type of user, including one or more of the parent nodes and one or more of the child nodes, and
(iii) a third collection of nodes in the particular hierarchy of nodes are to be displayed as selectable by both the first type of user and the second type of user, including multiple of the parent nodes and multiple of the child nodes, and wherein a particular child node from the third collection of nodes is a child node to a certain parent node from the first collection of nodes;
receiving, by the computing system, a first request by the first type of user to view a first display of the particular hierarchy of nodes on a first computing device, and in response sending, by the computing system, a first response that includes information for causing the first computing device to present the first display of the particular hierarchy of nodes, wherein the first display of the particular hierarchy of nodes:
(i) presents the first collection of nodes that the administer specified to be displayed as selectable by only the first type of user, including the at least one of the parent nodes and the at least one of the child nodes,
(ii) presents the third collection of nodes that the administrator specified to be displayed as selectable by both the first type of user and the second type of user, including the multiple of the parent nodes and the multiple of the child nodes, and
(iii) omits from display the second collection of nodes that the administrator specified to be displayed as selectable by only the second type of user; and receiving, by the computing system, a second request by the second type of user to view a second display of the particular hierarchy of nodes on a second computing device and in response sending, by the computing system, a second response that includes information for causing the second computing device to present the second display of the particular hierarchy of nodes, wherein the second display of the particular hierarchy of nodes:
(i) presents the second collection of nodes that the administrator specified to be displayed as selectable by only the second type user, including the one or more of the parent nodes and the one or more of the child nodes,
(ii) presents the third collection of nodes that the administrator specified to be displayed as selectable by both the first type of user and the second type of user, including the multiple of the parent nodes and the multiple of the child nodes, and further including a presentation of the particular node that is the child node to the certain parent node,
(iii) presents the certain parent node from the first collection of nodes that the administrator specified to be displayed as selectable by only the first type of user,
(iv) omits nodes in the first collection of nodes other than the certain parent node from presentation, and
(v) presents the particular node in a particular manner to indicate that the particular node is selectable, and presents the certain parent node in a manner that is different than the particular manner in order to indicate that the certain parent node is non-selectable.

7. The system of claim 6, wherein the first request was sent for receipt by the computing system in response to user selection of one of the nodes in the particular hierarchy of nodes that was being displayed in a collapsed manner.

8. The system of claim 6, wherein the first display of the particular hierarchy of nodes presents the particular node in the particular manner to indicate that the particular node is selectable, and presents the certain parent node in the particular manner to indicate that the certain parent node is selectable.

9. The system of claim 6, wherein presenting the certain parent node in the manner that is different than the particular manner includes displaying the certain parent node greyed out.

10. The system of claim 6, wherein the first type of user is identified as being the first type of user based on the first type of user having a particular user name, having a particular identifier, belonging to a certain group, or having a certain role.

* * * * *